May 25, 1926.

M. J. BROWN

VEHICLE SPRING

Filed Sept. 29, 1925

1,586,404

Inventor
Michael J. Brown

By Watson E. Coleman
Attorney

Patented May 25, 1926.

1,586,404

UNITED STATES PATENT OFFICE.

MICHAEL J. BROWN, OF FARGO, NORTH DAKOTA.

VEHICLE SPRING.

Application filed September 29, 1925. Serial No. 59,364.

This invention relates to vehicle springs and has for an important object thereof the construction of a vehicle spring providing a cushioning during either direction of movement of the vehicle with relation to the ground, that is to say, a resistance to movement of the vehicle either toward or away from the ground.

A further object of the invention is to provide a device of this character which is extremely simple in its construction and operation and which may be very readily applied to the vehicle.

A still further and more specific object of the invention is to provide a device of this character which may be applied to the vehicle to replace either transversely or longitudinally extending springs.

These and other objects I attain by the construction shown in the accompanying drawings, wherein for the purpose of illustration is shown a preferred embodiment of my invention and wherein:—

Figure 1:
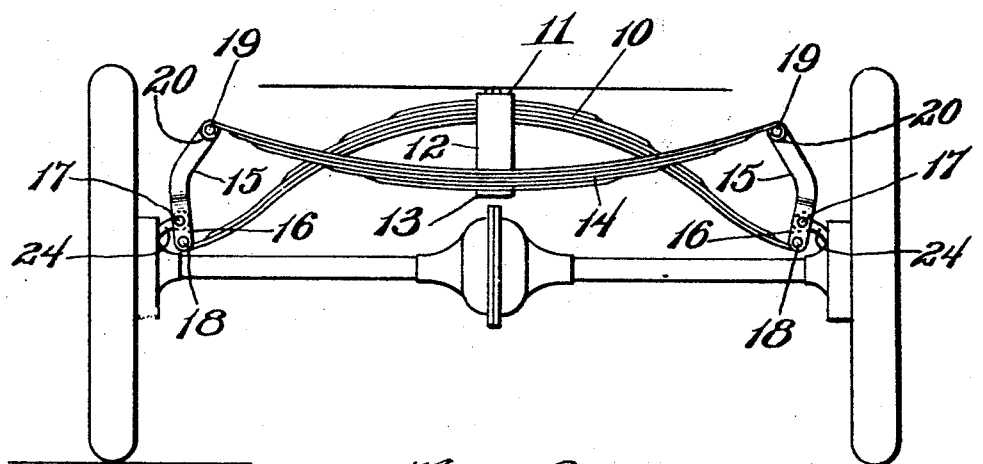
Figure 1 is a rear elevation of a vehicle having the springs thereof transversely arranged and embodying springs constructed in accordance with my invention.

Referring now more particularly to the drawings, the numeral 10 indicates a main spring which may have a desired number of leaves and is substantially semi-elliptic in form. The outer face of the bight or center of the spring 10 is engaged by the bight 11 of a U-shaped bracket, the arms 12 of which have at their lower ends angular portions 13 which in turn receive the bight portions of auxiliary springs 14 and 14ᵃ. The springs 14, 14ᵃ may likewise be of any desired strength and are semi-elliptic in construction.

The corresponding ends of the springs 10, 14 and 14ᵃ are connected by shackle elements 15, each shackle element 15 having one end thereof bifurcated to provide arms 16 through which pass bolts 17 and 18 which may be passed through the eyes of a perch and of the spring 10 respectively. The upper end of the shackle element provides a bearing for a bolt 19 with opposite ends of which are engaged the eyes 20 formed at the ends of the springs 14, 14ᵃ. In combination with this spring, I preferably provide an element in the form of a flat bar 21, the ends of which are turned upwardly and inwardly, as at 22, and there provided with eyes 23 for receiving the bolts 17.

Figure 2:
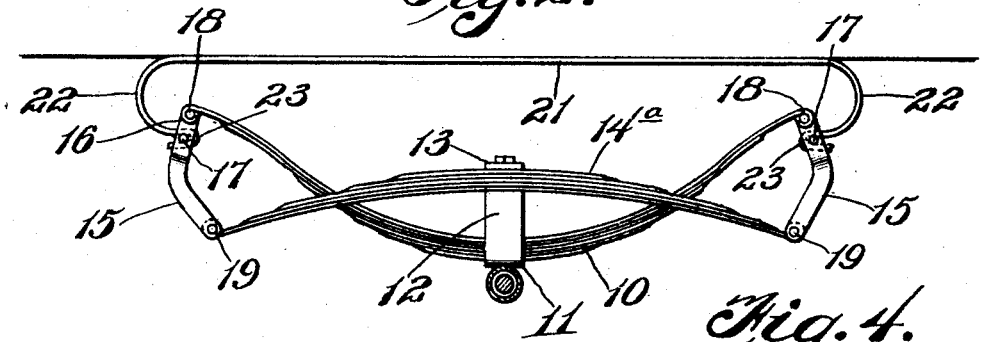
Figure 2 is a view showing the springs constructed in accordance with my invention applied to a vehicle, the springs of which extend longitudinally.
Figure 3:
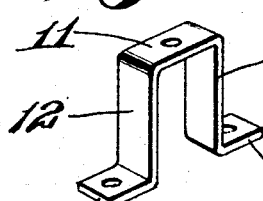
Figure 3 is a perspective of the bracket employed for connecting the sections of the two springs.
Figures 4, 5:
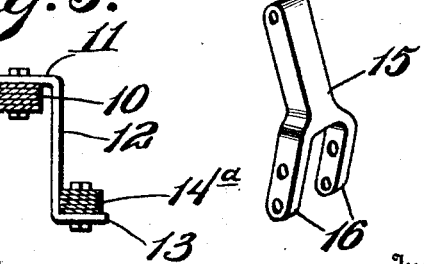
Figure 4 is a perspective of the connection between the outer ends of the springs.
Figure 5 is a transverse sectional view through the center of the spring.
Figure 6:
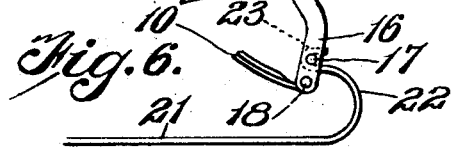
Figure 6 is a detail of the fragment of the end of the spring.

In applying the device to a vehicle where the spring extends transversely, as it does in one well known type of vehicle, the bight 11 of the bracket is seated against the vehicle and secured thereto in any suitable manner (not herein disclosed) while the bolts 17 are passed through the eyes of the perches 23 with which the vehicle axle is provided. In applying the device longitudinally of the vehicle as shown in Figure 2, the member 21 is preferably secured to the frame of the vehicle while the bight of the bracket is secured to the axle, as shown. In this case, the member 21 provides the perches for the reception of the bolts 17.

It will be obvious that the construction hereinbefore set forth is obviously capable of a certain range of change and modification without materially departing from the spirit of the invention and I accordingly do not limit myself to such specific structure except as hereinafter claimed.

I claim:—

1. A vehicle spring comprising a U-shaped bracket having angular ends upon the arms thereof, a semi-elliptic leaf spring engaged with the bight of the bracket, oppositely disposed semi-elliptic leaf springs engaged with the angular portions of the bracket, a connection between the ends of the last named leaf springs and a connection between the ends of the first named leaf spring and said connection between the last named leaf springs affording means for attaching the device to spring perches.

2. A vehicle spring comprising a U-shaped bracket having angular ends upon the arms thereof, a semi-elliptic leaf spring engaged with the bight of the bracket, oppositely disposed semi-elliptic leaf springs engaged with the angular portions of the bracket, a connection between the ends of the last named leaf springs, a connection between the ends of the first named leaf spring and said connection between the last named leaf springs affording means for attaching the device to spring perches and a flat bar having inturned ends provided with eyes for the reception of said means.

3. A vehicle spring comprising a U-shaped bracket having angular ends upon the arms thereof, a semi-elliptic leaf spring engaged with the bight of the bracket, oppositely disposed semi-elliptic leaf springs engaged with the angular portions of the bracket, bolts connecting corresponding ends of the last named springs and shackle elements having at one end thereof means for engaging an end of the first named spring and at the opposite end thereof means for rotatably receiving said bolts and means on said shackle elements for attaching the same to a spring perch.

4. A vehicle spring comprising a main semi-elliptic spring, auxiliary semi-elliptic springs oppositely disposed with relation to the main semi-elliptic spring, a connection between the bights of said main and auxiliary springs whereby the end portions of said auxiliary and main springs are held in crossed relation and shackle connections between corresponding ends of the auxiliary springs and said main spring.

5. A vehicle spring comprising a main semi-elliptic spring, auxiliary semi-elliptic springs oppositely disposed with relation to the main semi-elliptic spring, a connection between the bights of said main and auxiliary springs whereby the end portions of said auxiliary and main springs are held in crossed relation and shackle connections between corresponding ends of the auxiliary springs and said main spring including means for engaging a spring perch.

In testimony whereof I hereunto affix my signature.

MICHAEL J. BROWN.